(12) United States Patent
Irwin, Jr.

(10) Patent No.: US 8,240,576 B2
(45) Date of Patent: Aug. 14, 2012

(54) CARD WITH A DETACHABLE WIRELESS ANTENNA-BASED PAYMENT DEVICE

(75) Inventor: Joseph L. Irwin, Jr., Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/857,278

(22) Filed: Aug. 16, 2010

(65) Prior Publication Data

US 2012/0037708 A1     Feb. 16, 2012

(51) Int. Cl.
*G06K 19/06* (2006.01)
(52) U.S. Cl. .......................................... 235/492; 235/488
(58) Field of Classification Search .......................... None
See application file for complete search history.

(56) References Cited

U.S. PATENT DOCUMENTS

| | | | | |
|---|---|---|---|---|
| 5,570,081 | A * | 10/1996 | Holstrom | 340/573.3 |
| 6,412,702 | B1 * | 7/2002 | Ishikawa et al. | 235/492 |
| 6,585,165 | B1 * | 7/2003 | Kuroda et al. | 235/492 |
| 7,065,195 | B1 * | 6/2006 | Smith et al. | 379/144.01 |
| 8,167,198 | B2 * | 5/2012 | Phillips et al. | 235/379 |
| 2005/0045732 | A1 * | 3/2005 | Whitaker | 235/493 |
| 2007/0176007 | A1 * | 8/2007 | Priya et al. | 235/492 |
| 2008/0068181 | A1 * | 3/2008 | Phillips | 340/572.8 |
| 2008/0121707 | A1 * | 5/2008 | Phillips et al. | 235/451 |
| 2009/0045963 | A1 * | 2/2009 | Vigneron et al. | 340/572.8 |

* cited by examiner

*Primary Examiner* — Thien M. Le
*Assistant Examiner* — Sonji Johnson
(74) *Attorney, Agent, or Firm* — Michael A. Springs; Moore & Van Allen PLLC; James C. Edwards (57) ABSTRACT

Embodiments of the invention relate to for a card that includes a detachable wireless antenna-based payment device, such as a contactless Radio Frequency Identification (RFID) payment device or the like. The card is configured so as to alleviate or eliminate production problems associated with the adhesive-protecting backing being lifted or otherwise removed during handling of the card by the embossing equipment. In specific embodiments, the detachable wireless communication device is formed vertically along the width of the card, such that the detachment line extends along the width of the card. In such embodiments, by limiting the width of the wireless communication payment device to about one-third of the length of the card, the detachable wireless communication payment device is formed outside of the center region of the card, which is the region handled during the embossing procedure.

24 Claims, 6 Drawing Sheets

FIG. 7

CARD WITH A DETACHABLE WIRELESS ANTENNA-BASED PAYMENT DEVICE

FIELD

In general, embodiments of the invention relate to active communication payment devices and, more particularly, a card with a detachable wireless antenna-based payment device.

BACKGROUND

Figure 1:
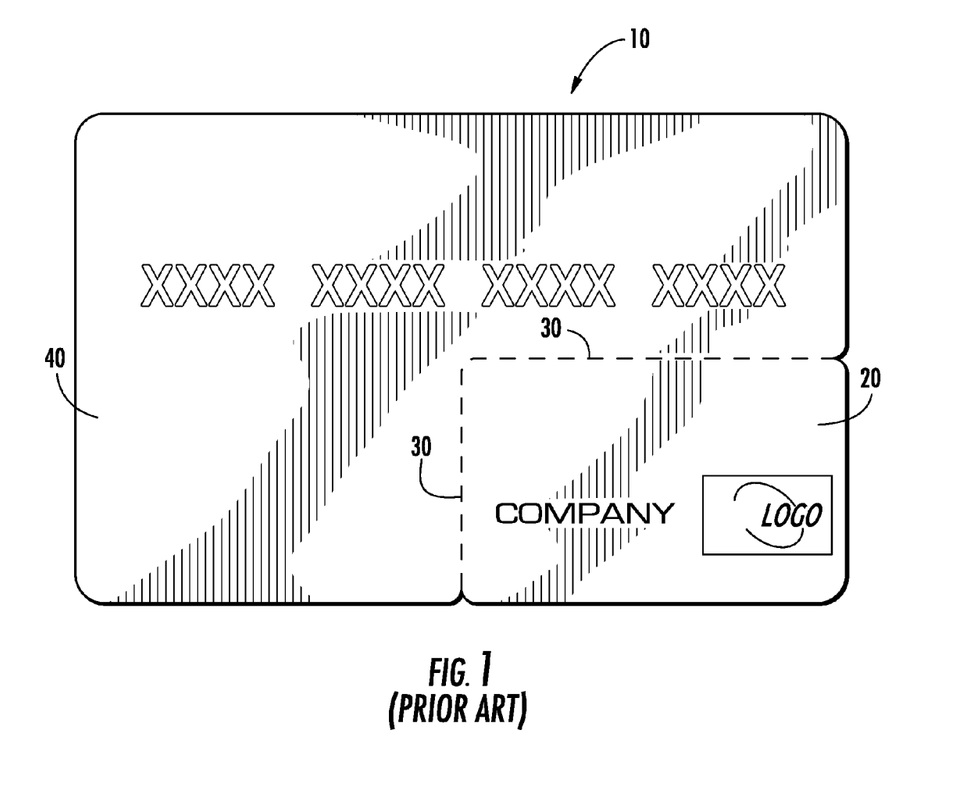
FIG. 1 is a front view of a card with a detachable wireless communication payment device, in accordance with the prior art.

FIG. 1 represents a front view of a prior art configuration of card 10 that includes a detachable payment device 20. The payment device 20 is a contactless payment device which relies on an embedded Radio Frequency Identification (RFID) antenna. The card 10, which is a standard CR80 full size credit/debit shell, is the means preferred by payment device-issuing entities, such as financial institutions, for distributing the payment device 20 to users, i.e., consumers.

The payment device 20 is detachable from the card via score lines 30, otherwise referred to herein as detachment lines. Upon receipt of the card by the user, the user is able to easily detach the payment device 20 from the disposable portion 40 by pulling or tearing at the score lines 30. Once the wireless communication payment device 10 is removed from the card, the disposable portion 40 can be disposed of by the user.

The entities that issue the payment device 20, such as financial institutions or the like, prefer to distribute the device 20 as a detachable portion of the card 10 for various different reasons. First, the payment device 20 typically does not include any user identification indicia. In order to insure that the payment device 20 is associated with the intended user/consumer, the disposable portion 40 of the card 10 includes the requisite user/consumer identifying information, such as name, account number or the like. In addition, since the card resembles a credit or debit card in shape and dimensions, the issuing entity is able to use the same production machinery to emboss the identifying information on the card as is used in the processing of credit and debit cards. Moreover, the payment device 20 is generally small in size and therefore by distributing the payment device 20 as a detachable portion of the card 10, the device-issuing entity insures that the device is not overseen in a mailing and, possibly, inadvertently discarded.

Figure 2:
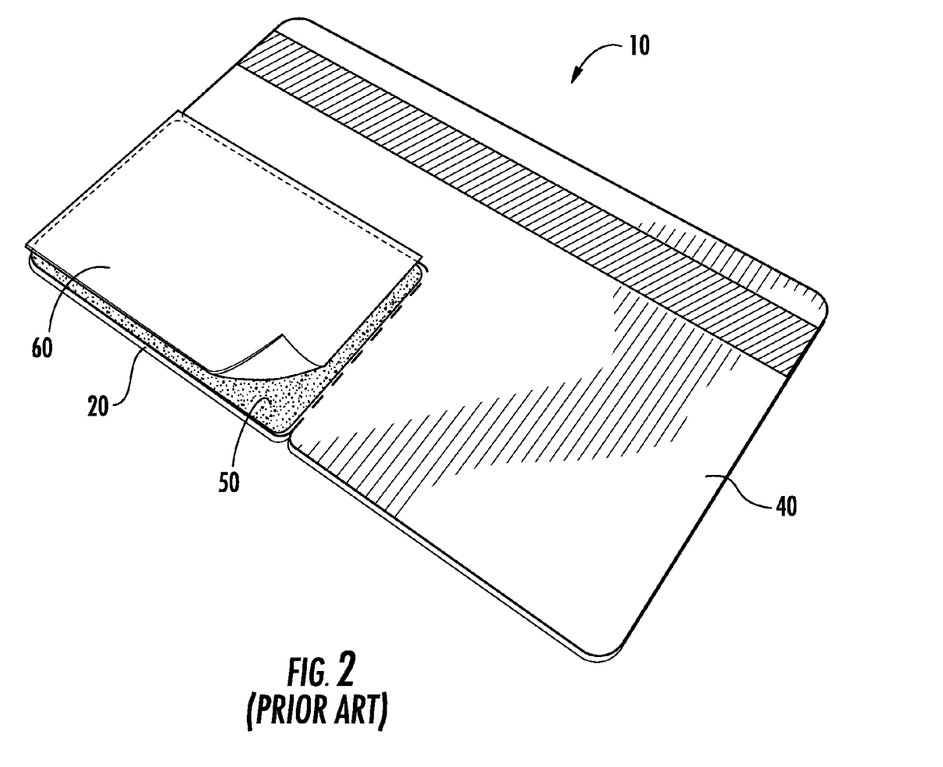
FIG. 2 is a perspective view of a card with a detachable wireless communication payment device in which the payment device is in the form of a sticker; in accordance with the prior art.

FIG. 2 is a perspective of view of card 10 including a payment device 20, in which the payment 20 takes the form of a sticker that can be affixed to an object in the possession of the user/consumer, such as a mobile device, for example, a cellular telephone or the like. In such embodiments, an adhesive material 50 is disposed on the backside facing of the payment device 20 and an adhesive-protecting backing 60, such as a suitable paper backing or the like, is disposed on the adhesive material 50. The user/consumer removes the adhesive-protecting backing 60 once they are ready to affix the sticker to a chosen object. It should be noted that the adhesive material 50 and the adhesive-protecting backing 60 are limited to being disposed on the backside facing of the payment device 20 and are not disposed on the backside facing of the disposable portion 40 of the card 10.

However, the current configuration of the payment device 20 on the card 10, in combination with the adhesive material 50 and backing 60, pose problems during the production process that embosses the user-identifying indicia on the disposable portion 40 of the card 10. The production process for embossing the user-identifying indicia on the disposable portion 40 of the card 10 occurs after the cards have been manufactured, meaning after the adhesive material 50 and adhesive-protecting backing 60 have been applied to the backside facing of the payment device 20. The production equipment used to emboss the user-identifying indicia provides for handling the cards with a suction-type handling mechanism that attaches to the center region of the card. In instances in which the payment device 20, and specifically the adhesive material 50 and backing 60 are located in the center region of the card 10, the suction-type handling mechanism experiences difficulty lifting the card into the embossing machine because the suction-type mechanism has difficulty forming a clean seal around the adhesive. These production issues result in an overall inefficient embossing process.

Therefore, a need exists to develop a card with a detachable payment device that is not susceptible to production embossing problems. Specifically, the desired card should alleviate or otherwise eliminate production embossing problems associated with the adhesive and adhesive-protecting backing, specifically, elimination of the handling problems associated with the adhesive underlying the area of the card handled by the suction-type mechanism. Moreover, the resulting payment device should be more functionally and aesthetically appealing to objects to which it is attached, such as cellular telephones or the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Thus, further details are provided below for a card, such as a standard CR-80 full size credit/debit-type card that includes a detachable payment device, such as a contactless Radio Frequency Identification (RFID) payment device or the like. The card is configured so as to alleviate or eliminate production problems associated with the adhesive-protecting backing being lifted or otherwise removed during handling of the card by the embossing equipment. In specific embodiments, the detachable wireless communication device is formed vertically along the width of the card, such that the score/detachment line extends along the width of the card. In such embodiments, by limiting the width of the wireless communication payment device to about one-third of the length of the card, the detachable wireless communication payment device is formed outside of the center region of the card. Since, the center region of the card is the region that is customarily handled by a suction-type handling mechanism in the embossing equipment, no production handling problems should result because the center region will be devoid of adhesive and adhesive-protective backing.

First embodiments of the invention are defined by a card that includes a first portion and a second portion that includes a payment device including an antenna, such as a Radio Frequency Identification (RFID) antenna or the like. The first portion is detachable from the second portion by a first detachment line that extends a width of the card.

In specific embodiments of the card, the payment device further includes an adhesive disposed on a facing of the second portion. In further related embodiments, the payment device includes an adhesive-protecting backer disposed on the adhesive. While in still further related embodiments, the payment device includes an insulation layer disposed between the facing of the second portion and the adhesive.

In further specific embodiments of the card, the payment device comprises a laminate construct that includes a first plastic layer, an antenna layer disposed on the first plastic layer and a second plastic layer disposed on the antenna layer. In further related embodiments, the laminate construct further includes an insulation layer disposed on the second layer, an adhesive layer disposed on the interference-blocking layer and an adhesive-protecting layer disposed on adhesive layer.

In other specific embodiments the card includes a magnetic strip that extends a length of a facing of the card. In specific related embodiments, the magnetic strip is further defined as being encoded only in the first portion. In other specific embodiments the card includes a magnetic strip that only extends a length of a facing of the first portion.

In yet further specific embodiments of the card, the first detachment line is substantially parallel to an edge of a width of the card. In related embodiments, the first detachment has a maximum distance from an edge of a width of the card of about one-third a length of the card.

Moreover, in further specific embodiments the card is a standard CR-80 sized card. In such embodiments, the first detachment line may be substantially parallel to an edge of a width of the card. In further such embodiments, the first detachment line may have a maximum distance from the edge of about 1.0625 inches.

In other specific embodiments of the card, the second portion further includes a second detachment line that extends from an edge of a width of the card to the first detachment line. In specific related embodiments, the second detachment line is generally perpendicular to the edge of the width of the card. In other specific related embodiments, the second line of attachment has a maximum distance from an edge of a length of the card of about 1.825 inches.

Second embodiments of the invention are defined by a card that includes a first portion configured such that contact of a suction-type handling mechanism during a card-personalization process is limited to the first portion and a second portion that includes a payment device including an antenna, such as a Radio Frequency Identification (RFID) antenna. The first portion being detachable from the second portion.

In specific embodiments, the payment device further includes an adhesive disposed on a facing of the second portion. In further related embodiments, the payment device includes an adhesive-protecting backer disposed on the adhesive. While in still further related embodiments, the payment device includes an insulation layer disposed between the facing of the second portion and the adhesive.

In other specific embodiments the card includes a magnetic strip that extends a length of a facing of the card. In related embodiments, the magnetic strip is encoded only in the first portion. In alternate specific embodiments, the card includes a magnetic strip that only extends a length of a facing of the first portion.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference may now be made to the accompanying drawings:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the present invention provide for a card, such as a standard CR-80 full size credit/debit-type card that includes a detachable payment device, such as a contactless Radio Frequency Identification (RFID) payment device or the like. The card is configured so as to alleviate or eliminate production problems associated with the adhesive-protecting backing being lifted or otherwise removed during handling of the card by the embossing equipment. In specific embodiments, the detachable wireless communication device is formed vertically along the width of the card, such that the score/detachment line extends along the width of the card. In such embodiments, by limiting the width of the wireless communication payment device to about one-third of the length of the card, the detachable wireless communication payment device is formed outside of the center region of the card. Since, the center region of the card is the region that is customarily handled by a suction-type handling mechanism in the embossing equipment, no production handling problems should result because the center region will be devoid of adhesive and adhesive-protective backing.

Figure 3:
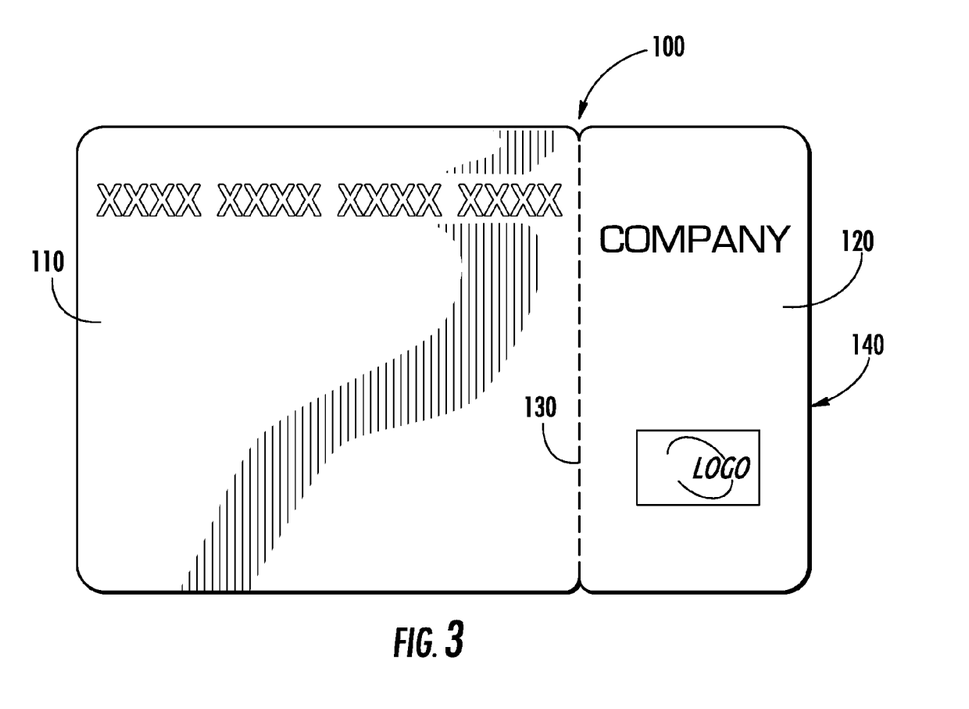
FIG. 3 is front view of a card with a detachable wireless communication payment device; in accordance with present embodiments of the invention.

FIG. 3 is a front view diagram of a card 100, such as a CR-80 sized card shell, in accordance with embodiments of the present invention. The card includes a first portion 110 and a second portion 120 that is detachable from the first portion by a detachment line 130 that extends a width of the card 100. The second portion 120 forms a payment device that includes an antenna. The antenna, which may be a Radio Frequency Identification (RFID) type antenna is embedded in second portion 120 and, as such is not shown in the front view of FIG. 3. The first portion 110 is a disposable portion that may be disposed of by the user/recipient upon detaching the second portion 120 payment device.

As shown the detachment line 130, which may be a score line or the like, is configured substantially parallel to an edge 140 of the width of the card 100. In specific embodiments of the card, the detachment line has a maximum distance from the edge 140 of about one-third the length of the card. In those embodiments, in which the card is a standard CR-80 type card, having dimensions of about 3.375 inches in length by about 1.125 inches in width, the detachment line 130 has a maximum distance from the edge of about 1.125 inches, preferably about 1.0625 inches.

Figure 4A:
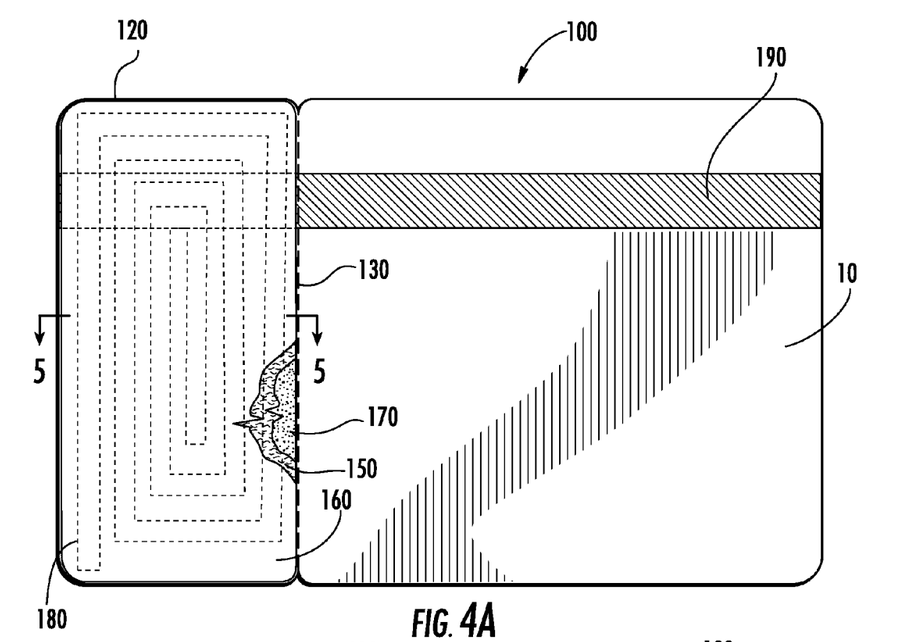
FIG. 4A is a back view of a card with a detachable wireless communication payment device, highlighting a full-length magnetic strip; in accordance with embodiments of the present invention.

FIG. 4A is a back view diagram of a card 100 configured such that the second portion 120 payment device takes the form of a sticker that may be affixed to the user's object of choice, such as a mobile device or the like; in accordance with embodiments of the present invention. Thus, the backside of card 100 includes adhesive layer 150 and adhesive-protective layer 160. The adhesive layer 150 is typically formed of a permanent adhesive, for example, a water-based acrylic adhesive or the like. The adhesive-protecting layer 160 forms a backer for the adhesive layer such that the adhesive-protecting layer 160 is removed by the user prior to sticking the payment sticker of the object of choice. Additionally, insulation layer 170 may be disposed on the card 100 between the outer surface of the card 100 and the adhesive layer 150. The insulation layer 170 serves to provide insulation between the antenna 180 embedded in the second portion 120 payment device and interference-causing mechanisms in the object to which the sticker is affixed, such as cellular telephones or the like. The insulation layer may be formed of ferrite or any other suitable insulation material.

Additionally, FIG. 4A includes a magnetic strip 190 that extends lengthwise across a top portion of card 100. As such, the magnetic strip 190 extends across the first portion 110 and the second portion 120. Moreover, in the second portion 120, the magnetic strip 190 underlies the insulation layer 170, adhesive layer 150, and the adhesive-protecting layer 160. In production, the magnetic strip 190 is encoded with information that identifies the user/recipient of the payment device. Additionally, the information encoded on the magnetic strip 190 is used to marry the card 100 with an associated credit or debit card, which is typically mailed with the card 100 to the user/recipient. In otherwise the information encoded on the magnetic strip 190 ensures that the correct payment card and associated debit/credit card are sent to the right user/recipient. Therefore, in those embodiments in which the magnetic strip underlies the insulation layer 170, adhesive layer 150, and the adhesive-protecting layer 160 in the second portion 120, it is necessary to limit encoding of information on the magnetic strip 190 to the first portion 110 of the card 100. By limiting encoding of information to that portion of the magnetic strip 190 included in the first portion 110, it ensures that the information is subsequently properly read when exposing the magnetic strip 190 to a reader device.

Figure 4B:
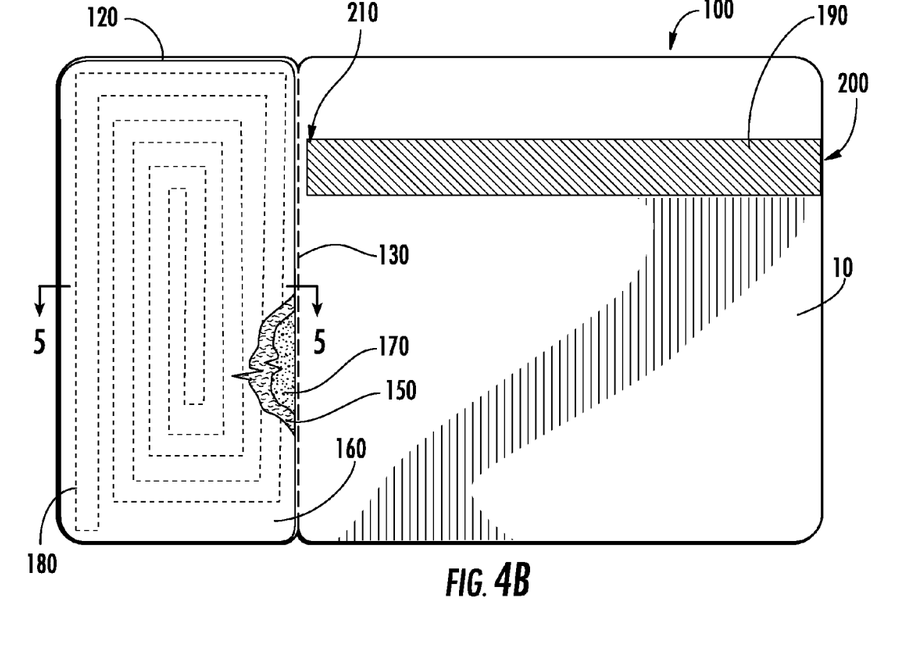
FIG. 4B is a back view of a card with a detachable wireless communication payment device, highlighting a magnetic strip limited to the disposable portion; in accordance with embodiments of the present invention.

FIG. 4B provides for a back side view of card 100, in accordance with alternate embodiments of the present invention. As shown, the magnetic strip 190 is limited to extending lengthwise across the first portion 110 of the card 100. Thus, the length of the magnetic strip 190 extends from an edge 200 of a width of the card 100 to an end edge 210 that does exceed or otherwise cross the detachment line 130. Such a configuration as shown in FIG. 4B ensures that the information encoded in magnetic strip 190 is limited to the first portion 110, since the magnetic 190 does not extend into the second portion 120.

Figure 5:
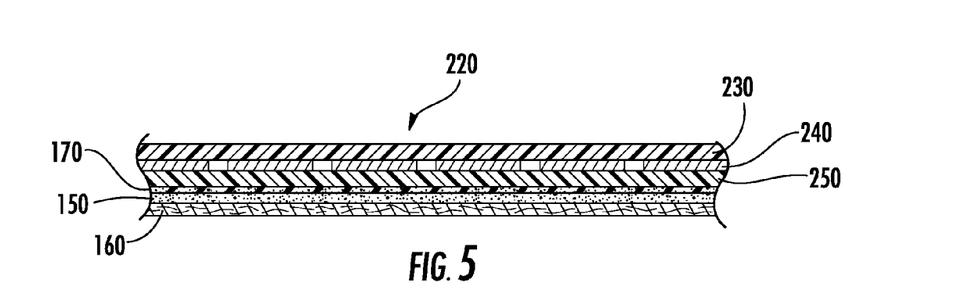
FIG. 5 is a cross-sectional view of the laminate construct of a sticker-like wireless communication payment device; in accordance with embodiments of the present invention.

FIG. 5 provides for a cross-sectional view of the laminate construct of the payment device 220 formed in the second portion 120 of card 100, in accordance with embodiments of the present invention. The payment device includes first plastic layer 230, formed of polyvinylchloride (PVC) or the like, an antenna layer 240 (i.e., antenna 180 of FIGS. 4A and 4B), formed of copper or the like, and a second polymer layer 240 also formed of PVC or the like. Additionally, the laminate construct of payment device 220 includes insulation layer 170, adhesive layer 150 and adhesive-protecting layer 160.

Figure 6:
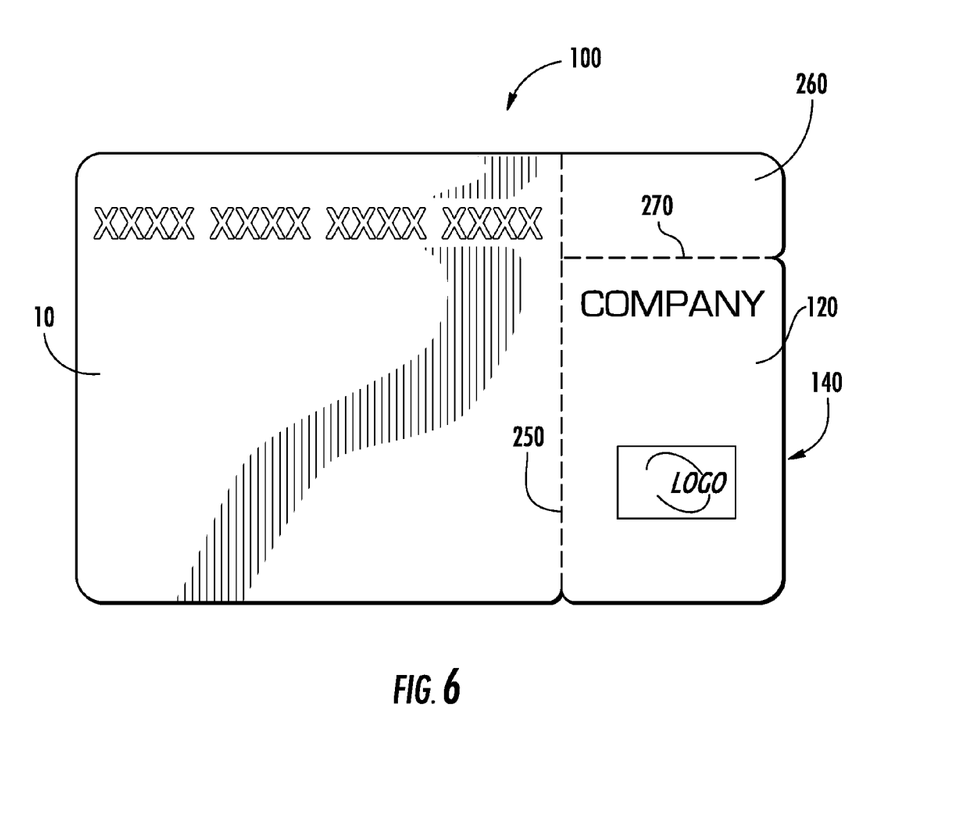
FIG. 6 is a front view of a card with a detachable wireless payment communication device, highlighting an alternate geometric configuration of the payment device; in accordance with embodiments of the present invention.

FIG. 6 provides a front view diagram of a card 100 including an alternate embodiment second portion 120; in accordance with alternate embodiments of the invention. The card 100 includes first portion 110 and second portion 120 that is detachable from the first portion 110 by a first detachment line 250 that extends a width of the card 100 and is substantially parallel to an edge 140 of the width of the card 100. Additionally, according to specific embodiments as shown, the card includes third portion 260 that is detachable for the first portion 110 and the second portion 120 by second detachment line 270. The second detachment line 270 that extends from the edge 140 of the width of the card 100 to the first detachment line 250. Additionally, according to specific embodiments, the second detachment line 270 is generally perpendicular to the edge 140 of the width of the card 100. The first and third portions are disposable portions, which may be disposed of by the user/recipient upon detaching the second portion 120 payment device from the first portion 100 and the third portion 260. The configuration shown in FIG. 6 yields a payment device similar in dimensions to the payment device shown in FIG. 1

Figure 7:
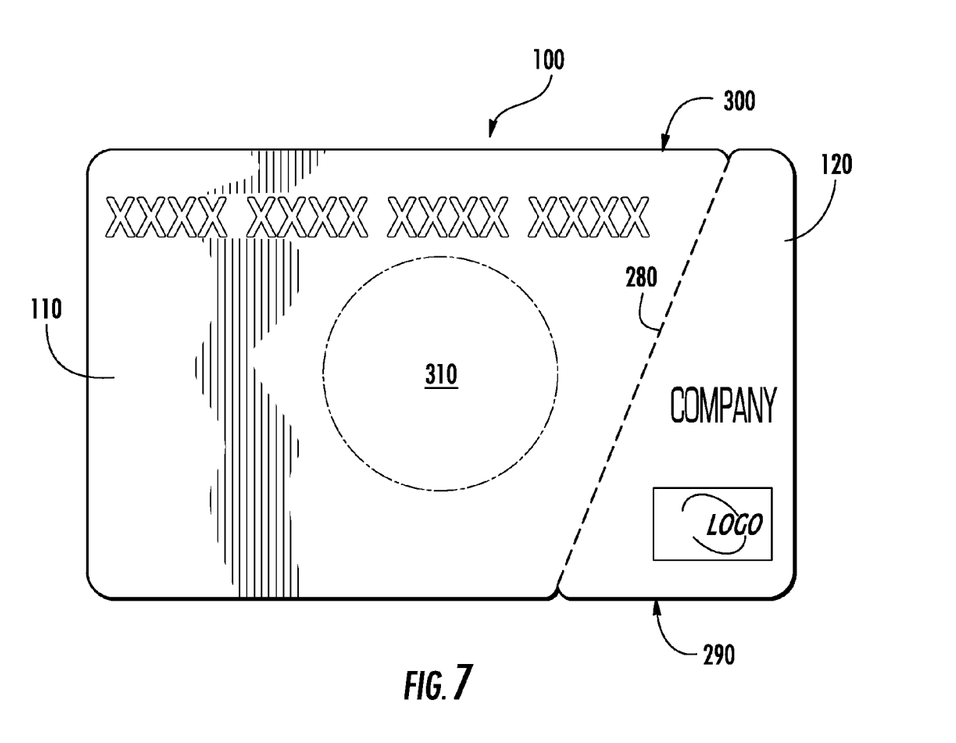
FIG. 7 is a front view of a card with a detachable wireless payment communication device, highlighting an alternate geometric configuration of the payment device; in accordance with embodiments of the present invention.

FIG. 7 depicts a front view of a card 100 including an alternate embodiment of the second portions 120; in accordance with further alternate embodiments of the invention. Similar to the embodiments shown in FIGS. 3 and 6, the card 100 includes first portion 110 and second portion 120, which forms a payment device that includes an antenna. The first portion 110 is a disposable portion that may be disposed of by the user/recipient upon detaching the second portion 120 payment device.

The card includes a first portion 110 and a second portion 120 that is detachable from the first portion by a detachment line 280 that extends a width of the card 100. Further the detachment line 280 extends at an angle from a first edge 290 of a length of the card 100 to a second edge 300 of a length of the card 100, resulting in a second portion 120 payment device having a generally wedge-shape.

Additionally, FIG. 7 illustrates region 310 that is generally the region of the card that is handled by a suction-type handling mechanism during the embossing processing of the card 100. The region 310 is shown in FIG. 7 to illustrate that the second portion 120 is outside of the region 310. Therefore, since no adhesive or adhesive-protecting backer underlie region 310 in the configuration of the second portion 120 payment device, the card 100 will not be prone to embossing productions problems associated with the suction-type mechanism being unable to lift the card into the embossing machine. Thus, according to other alternate embodiments of the invention, the second portion 120 payment device may be configured to occupy any portion of the card 100 that is outside of region 310.

Thus, present embodiments herein disclosed provide for a card, such as a CR-80 sized credit card-style card, that includes a detachable wireless antenna-based payment device, such as a contactless Radio Frequency Identification (RFID) payment device or the like. The card is configured so as to alleviate or eliminate production problems associated with the adhesive-protecting backing being lifted or otherwise removed during handling of the card by the embossing equipment. In specific embodiments, the detachable wireless communication device is formed vertically along the width of the card, such that the detachment line extends along the width of the card. In such embodiments, by limiting the width of the wireless communication payment device to about one-third of the length of the card, the detachable wireless communication payment device is formed outside of the center region of the card, which is the region handled during the embossing procedure.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A card comprising:
    a first portion; and
    a second portion that comprises:
        a payment device including an antenna,
        an insulation layer disposed on a facing of the second portion,
        an adhesive layer disposed on the insulation layer, and
        an adhesive-protecting backer disposed on the adhesive layer and configured to be removable for the purpose of attaching an object to the second portion via the adhesive layer,
    wherein the first portion is detachable from the second portion by a first detachment line that extends a width of the card and wherein the insulation layer is configured to provide insulation between the antenna and the object.

2. The card of claim 1, wherein the payment device further comprises a laminate construct including:
    a first plastic layer,
    an antenna layer disposed on the first plastic layer, and
    a second plastic layer disposed on the antenna layer.

3. The card of claim 1, wherein the laminate construct further includes the insulation layer disposed on the second plastic layer.

4. The card of claim 3, wherein the laminate construct further includes the adhesive layer disposed on the insulation layer.

5. The card of claim 4, wherein the laminate construct further includes the adhesive-protecting backer disposed on the adhesive layer.

6. The card of claim 1, further comprising a magnetic strip that extends a length of a facing of the card.

7. The card of claim 6, wherein the magnetic strip is encoded only in the first portion.

8. The card of claim 1, further comprising a magnetic strip that extends a length of a facing of the first portion.

9. The card of claim 1, wherein the first detachment line is substantially parallel to an edge of a width of the card.

10. The card of claim 9, wherein the first detachment line has a maximum distance from an edge of a width of the card of about one-third a length of the card.

11. The card of claim 1, wherein the card is a CR80 sized card.

12. The card of claim 11, wherein the first detachment line is substantially parallel to an edge of a width of the card.

13. The card of claim 12, wherein the first detachment line has a maximum distance from the edge of about 1.0625 inches.

14. The card of claim 1, wherein the second portion further includes a second detachment line that extends from an edge of a width of the card to the first detachment line.

15. The card of claim 14, wherein the second detachment line is generally perpendicular to the edge of the width of the card.

16. The card of claim 15, wherein the second line of attachment has a maximum distance from an edge of a length of the card of about 1.875 inches.

17. The card of claim 1, wherein the antenna is a Radio Frequency Identification (RFID) antenna.

18. The card of claim 1, wherein the first portion includes raised indicia printed on a facing, wherein the indicia is associated with a holder of the card.

19. The card of claim 1, wherein the first portion of the card is disposable upon detaching the first portion of the card from the second portion.

20. A card comprising:
    a first portion configured such that contact of a suction-type handling mechanism during a card-personalization process is limited to the first portion; and
    a second portion comprising:
        a payment device including an antenna,
        an insulation layer disposed on a facing of the second portion,
        an adhesive layer disposed on the insulation layer, and
        an adhesive-protecting backer disposed on the adhesive layer and configured to be removable for the purpose of attaching an object to the second portion via the adhesive layer,
    wherein the first portion is detachable from the second portion and wherein the insulation layer is configured to provide insulation between the antenna and an object.

21. The card of claim 20, further comprising a magnetic strip that extends a length of a facing of the card.

22. The card of claim 21, wherein the magnetic strip is encoded only in the first portion.

23. The card of claim 20, further comprising a magnetic strip that extends a length of a facing of the first portion.

24. The card of claim 20, wherein the antenna is a Radio Frequency Identification (RFID) antenna.

* * * * *